L. P. PETERSON.
ATTACHMENT FOR INTERNAL COMBUSTION ENGINES.
APPLICATION FILED APR. 14, 1920.
1,350,385. Patented Aug. 24, 1920.
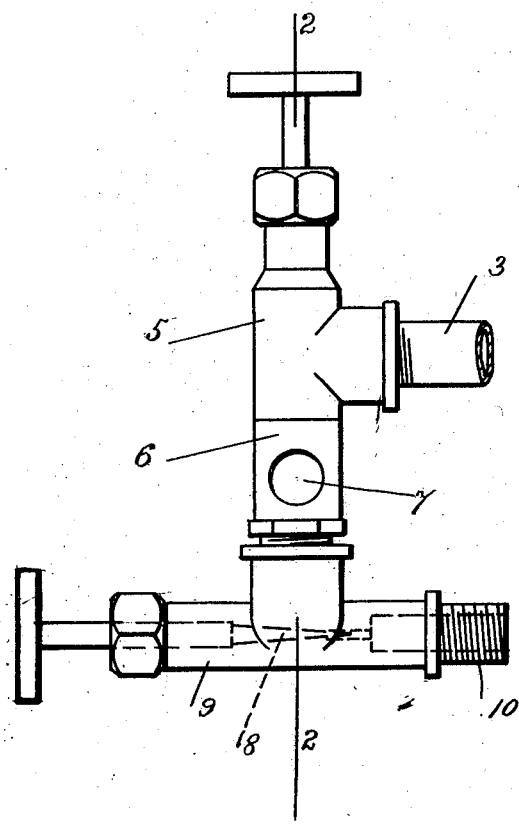
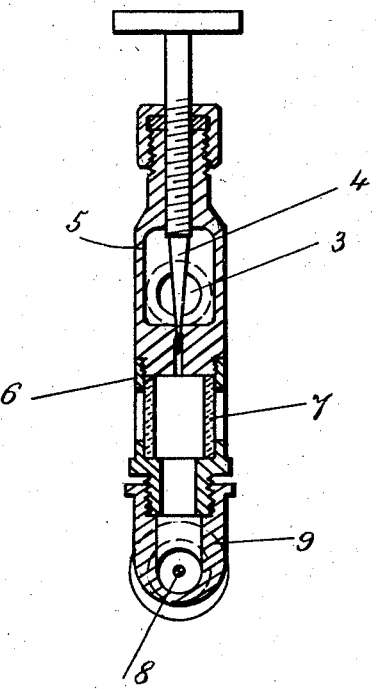

UNITED STATES PATENT OFFICE.

LOUIS P. PETERSON, OF ENDERLIN, NORTH DAKOTA.

ATTACHMENT FOR INTERNAL-COMBUSTION ENGINES.

1,350,385. Specification of Letters Patent. Patented Aug. 24, 1920.

Application filed April 14, 1920. Serial No. 373,773.

*To all whom it may concern:*

Be it known that I, LOUIS P. PETERSON, a citizen of the United States, residing at Enderlin, in the county of Ransom and State of North Dakota, have invented certain new and useful Improvements in Attachments for Internal-Combustion Engines, of which the following is a specification.

This invention relates to attachments for internal combustion engines which supply a small quantity of water to mix with the combustible charge before it is ignited in the power cylinder; and it consists in the novel construction and combination of the parts hereinafter fully described and claimed.

In the drawings, Figure 1 is a side view of an attachment constructed according to this invention. Fig. 2 is a cross-section through the device, taken on the line 2—2 in Fig. 1.

A supply pipe 3 for water is provided and communicates with a needle valve 4 arranged vertically in a valve casing 5. A cylindrical observation chamber 6 is secured axially under the lower end of the valve casing 5, and is provided with a window 7 of glass or other transparent material. A second needle valve 8 is arranged horizontally in a valve casing 9 which is secured to the lower part of the observation chamber 6. The valve casing 9 is provided with means for securing it to the engine, such as the screwthreaded portion 10.

The valve casings and observation chamber are air-tight, and the valve casing 9 is secured to any part of the engine which is subjected to the suction caused by the piston of the power cylinder drawing in the inflammable charge of air and hydrocarbon. The use of a small quantity of water is desirable to prevent carbon deposits in the cylinder, and for other purposes, and the employment of the two adjustable needle valves arranged as set forth enables the supply of water to be proportioned with great exactness.

What I claim is:

A moistening attachment for an internal combustion engine, comprising an upper valve casing provided with an inlet for water and a vertically arranged outlet, a needle valve controlling the said outlet, an observation chamber secured to the lower end of the upper valve casing and provided with a sight window, a lower valve casing provided with an inlet for the water which falls drop by drop through the observation chamber, said lower valve casing being secured to the lower part of the observation chamber and provided with a horizontally arranged outlet for water and with means for securing it to an engine, and a needle valve controlling the water outlet of the lower casing.

In testimony whereof I have affixed my signature.

LOUIS P. PETERSON.